United States Patent Office 3,634,333
Patented Jan. 11, 1972

3,634,333
PROCESS FOR COATING ZINC OXIDE POWDER WITH CADMIUM SULFIDE
Yasuo Tamai, Asaka-shi, Japan, assignor to Fuji Photo Film Co., Ltd., Ashigara-Kamigun, Kanagawa, Japan
No Drawing. Filed Apr. 8, 1969, Ser. No. 814,435
Claims priority, application Japan, Apr. 9, 1968, 43/23,594
Int. Cl. C23c 3/04
U.S. Cl. 252—501                                    11 Claims

ABSTRACT OF THE DISCLOSURE

Process for producing photoconductive powder comprising heating at a temperature over 40° C. a slurry prepared by adding photoconductive zinc oxide to a solution comprising primarily water, a sulfur containing water soluble compound which forms sulfur ions, and a water soluble cadmium compound. The cadmium sulfide is deposited on the surface of the zinc oxide during heating.

BACKGROUND OF THE INVENTION

Field of the invention

This invention relates to a process for producing a photoconductor used for an electrophotographic light sensitive layer, and particularly to a process for producing zinc oxide adapted for electrophotography having a high sensitivity which comprises covering the surface of zinc oxide particles with a thin layer of cadmium sulfide.

Description of the prior art

It is well known to obtain zinc oxide having an expanded sensitivity to visible light for use in electrophotography by reacting zinc oxide with hydrogen sulfide or carbon disulfide. Further, it is also well known to enhance the effect of surface modification by additionally reacting with selenium. However, these methods require a heat treatment.

In addition, a thin layer of an intimate mixture of cadmium sulfide, which is a known photoconductor having high sensitivity, and an insulating resin is known as an electrophotographic light sensitive layer.

Further, it is also possible to produce an electrophotographic light sensitive layer having an expanded sensitivity to visible light by using cadmium sulfide in combination with zinc oxide. However, cadmium sulfide has the disadvantage of being very expensive when compared with zinc oxide. This results from the complicated production of photoconductive cadmium sulfide.

Though it is possible to expand the sensitive areas of a zinc oxide light sensitive layer using a colored powder having low photoconductivity such as Cadmium Orange (a mixture of cadmium sulfide and cadmium carbonate) with zinc oxide, the mixing of such a colored powder causes coloring of the light sensitive layer, and decoloring thereof is very difficult. Consequently such an approach is not preferred.

A further known method comprises adsorbing sensitizing dyes into zinc oxide in order top rovide a panchromatic zinc oxide light sensitive layer. However, various problems are encountered in the production thereof when such coloring materials are used. The adsorbed coloring materials easily decompose during storage because of pehraps the catalytic action of zinc oxide. Further, when using a sensitive layer containing a resin as the binder which cures under the influence of oxygen, such as an alkyd resin, it has often been found that sensitizing dyes rapidly decompose due to the heavy metal compounds which are added to the layer in order to accelerate curing.

As an area of application in which a sensitive layer having high sensitivity is required, and coloring thereof is allowed, there is electrophotographic marking on metal materials. In such a case, it is possible to utilize a light sensitive material such as cadmium sulfide. However, since the sensitive layer used for marking is used in processing steps such as welding and cutting with expoure to a flame of high temperature, the sensitive layer decomposes under heat and generates harmful decomposition gases. Consequently, the practical usage thereof is inferior. Since sulfide-type photoconductors geneate sulfur oxide, usage thereof in large amounts is obviously impractical without some type of protection apparatus.

SUMMARY OF THE INVENTION

The present invention provides a unique process for producing sensitized finely divided photoconductive powders especially adapted for use in electrophotography. Sensitivity is illustrated primarily in the blue region. The process comprises heating, at a temperature over 40° C., a slurry prepared by adding a finely divided photoconductive zinc oxide powder to a solution comprising water as the main ingredient, a sulfur containing water soluble compound which forms sulfur ions by decomposition upon heating to a temperature over 40° C. in water, and a water soluble cadmium compound. Cadmium sulfide is deposited in a very thin layer on the surface of the photoconductive zinc oxide particles during heating.

One object of this invention is to provide a process for producing novel and slightly colored photoconductive particles adapted for electrophotography having a sensitivity to blue light.

Another object of this invention is to provide a process for effectively sensitizing photoconductive zinc oxide particles by using a small amount of cadmium sulfide.

A further object of this invention is to provide a process for producing photoconductive particles having good storage ability and good stability.

DESCRIPTION OF THE PREFERRED EMBODIMENTS

In this invention, the thin cadmium sulfide layer is formed on the surface of a zinc oxide fine crystal powder by dispersing a commercial zinc oxide having good photoconductivity in water and causing a precipitation reaction of the cadmium sulfide in the water. The procedure of the precipitation reaction is an important problem. For instance, in a process involving rapid reaction which comprises dispersing zinc oxide in an aqueous solution containing cadmium ions ($Cd^{++}$) and blowing a hydrogen sulfide gas therein or adding a sodium sulfide solution thereto, it is not possible to effectively cover the surface of zinc oxide with a very small amount of cadmium sulfide because of the formation of cadmium sulfide particles in the solution.

As the result of many studies concerning precipitation processess for cadmium sulfide, several important parameters have been discovered which are necessary to obtain good results when a so-called uniform precipitation reaction reaction is caused to take place in a zinc oxide suspension. Namely, the zinc oxide is dispersed in an aqueous solution containing $Cd^{++}$, and then compounds which form sulfur ions ($S^{--}$) by heating at over 40° C. are dissolved therein. This resulting suspension does not react at the room temperature. When this suspenion is heated gradually, $S^{--}$ is formed in the solution and consequently cadmium sulfide is created thereby. The formation of such cadmium sulfide occurs simultaneously and uniformly in every part of the solution. Further, the cadmium sulfide is preferentially deposited on the surface of zinc oxide. This is believed due to the fact that since the solubility of the sulfide is proportional to the square of hydrogen ion concentration in the solution, the cadmium sulfide is preferentially deposited on the zinc oxide which has a basic surface.

As representative chemicals for carrying out such a uniform reaction, there are the following materials: as the source of cadmium ion ($Cd^{++}$): water soluble inorganic or organic cadmium salts, for example, cadmium chloride, cadmium bromide, cadmium iodide, cadmium nitrate, cadmium sulfate and cadmium acetate.

As the compounds which produce sulfur ions under heating: water soluble thioalkaylamides and alkyl thioureas are employable, and especially thioformamide, thioacetamide and thiourea show excellent results. The reaction sufficiently proceeds at less than 100° C. using these compounds, and almost the total amount of $Cd^{++}$ used is deposited on the zinc oxide particles as cadmium sulfide.

If sulfur containing "destructible" compounds having a high decomposition temperature or compounds having low solubility at less than 100° C. are used as the raw materials, the same results can be obtained by carrying out the reaction at over 100° C. in an autoclave.

The thus resulting light yellow photoconductive powder is separated from the mother liquor and dried, in the air or by any equivalent. An electrophotographic light sensitive layer can be produced by applying a mixture of the resultant powder and an insulating resin onto a conductive support. Further, the sensitive layer can be produced without drying by substituting water in the zinc oxide containing slurry for acetone etc., and by further adding resins. The electrophotographic light sensitive layer produced using a photoconductive powder prepared by the process of this invention has a light sensitivity at 400–510 m$\mu$ (which is due to the light absorption of the cadmium sulfide deposited on the zinc oxide surface) in addition to a 360–390 m$\mu$ sensitivity (which is the inherent sensitivity of zinc oxide). This sensitive layer has a sensitivity of about 10–100 fold larger than that of untreated zinc oxide.

A layer having a soft gradation suitable for usage as a continuous gradation source can be produced by mixing a photoconductive powder prepared by the process of this invention and an untreated zinc oxide in any suitable amount. The sensitive layer produced using a photoconductor by the process of this invention suffers little change in photoconductivity by the lapse of time, and has a good storage ability. Since it is not necessary to treat the photoconductor at a high temperature, the resulting particles need not be sintered, and accordingly, a sensitive layer having a very smooth surface can be produced.

The photoconductive particles produced by this invention are characterized by the fact that cadmium sulfide is deposited very thinly around the zinc oxide particle. It is believed that this condition somewhat coresponds to the case of a zinc oxide sensitized with dyes. Specifically, the zinc oxide acts as a photoconductor, and the cadmium sulfide gives expanded photoconductivity to the photoconductor.

Heretofore, cadmium sulfide produced by precipitation processes did not act as a photoconductor if the activation treatment and heat treatment were not sufficiently carried out. However, according to this invention, zinc oxide acts as the main photoconductor and cadmium sulfide deposited on the zinc oxide surface by the uniform precipitation thereof acts as the absorbent for visible rays. Therefore, cadmium sulfide may be used in a very small amount. For instance, about $\frac{1}{10,000}$ (based on the weight of zinc oxide) is effective, with very good results being obtained by adding $\frac{1}{1000}-\frac{5}{100}$. (It is possible to add a large amount insofar as coloring of the sensitive layer is out of the question. The reason such a small amount of cadmium sulfide acts effectively is that the zinc oxide is very effectively covered with cadmium sulfide by the process of this invention. A far larger amount of photoconductive cadmium sulfide powder is required in order to obtain the same effect as in this invention by mixing photoconductive cadmium sulfide with photoconductive zinc oxide.

As the zinc oxide upon which the cadmium sulfide is deposited any zinc oxide may be used so long as it is photoconductive. Any zinc oxide which has been used as a prior art electrophotographic sensitive layer is most preferably used. A typical zinc oxide is one that is produced by the gas phase synthesis (French method). Zinc oxide produced by other methods, for example by thermal decomposition of zinc oxalate, can be used according to the final objective of the manufacturers.

As the solvent used in the solution reaction, water is most preferred, although some organic solvent which is compatible with water may be added thereto. In a system which does not contain sufficient water, thioacetamide and other compounds are hard to decompose, and the velocity of the reaction is low. Whether the system is utilized for the practice of this invention or not can be ascertained by determining if the formation of cadmium sulfide precipitate is easy or not, i.e., by dissolving the sulfur containing compound and the cadmium compound without adding finely divided zinc oxide particles, and heating.

The invention will now be explained with reference to the following examples.

Example 1

To 50 g. of photoconductive zinc oxide powder (produced by the Sakai Chemical Co.) charged in a glass beaker, 800 mg. of cadmium chloride ($CdCl_2 \cdot 2.5H_2O$) and 500 ml. of distilled water were added. After stirring with a glass rod, the mixture was dispersed by an ultrasonic wave (29 kc.) to produce an aqueous slurry. 1000 mg. of thiourea were then dissolved therein and the mixture was stirred. Thus resulting slurry was white. The beaker was then heated at 95° C. on a water bath. As the temperature of the slurry elevated, it was observed that the slurry became yellowish. After being permitted to stand at 95° C. for 40 minutes, the mother liquor was removed off by centrifugal separation. The residue was redispersed in methanol and filtered. The resulting light yellow precipitate was dried in an air bath at 120° C.

Into 20 g. of the thus resulting powder, 4 g. of a vinyl chloride-based copolymer and 25 ml. of butyl acetate were added. The mixture was stirred with a homomixer for 5 minutes. The light yellow paste obtained was applied to the aluminum surface of an aluminum foil laminated paper so as to provide a final dry thickness of 8$\mu$. After application, the paper was dried in the dark and subjected to dark adaptation.

The sensitive layer thus obtained has a −334 v. surface electric potential when there was applied thereto a corona discharge at −7 kv. in the dark. The electric potential residual ratio in the dark after 1 minute was 78%. This layer had an increased sensitivity of about 60 fold for exposure to a white light source (2000° K.) when compared with an untreated zinc oxide sensitive layer. It was found that the range of 400–500 m$\mu$ was sensitized by the treatment of this invention, when the layer was exposed by a spectroscope after electrostatic charging and developed with a liquid developer including a positive toner. The maximum wave length of sensitization was 475 m$\mu$. The value ($\gamma$) showing gradation, which is illustrated by a curve of the residual electrical potential by percentage per exposure, was 2.2. Developing concentration at the maximum residual electric potential was 2.0.

Example 2

A sensitive layer was produced by the same procedure as in Example 1 using 5 g. of a photoconductive powder produced by the process shown in Example 1 and 15 g. of photoconductive zinc oxide.

This sensitive layer illustrated a —308 v. surface electric potential under a —7 kv. corona discharge. This layer had about a 20 fold sensitivity increase for exposure to a white light source (2000° K.) when compared with an untreated zinc oxide sensitive layer. The value ($\gamma$) showing the gradient was 1.65, which meant the layer had a soft gradation since conductors having a different sensibility were used as a mixture. Using this sensitive layer, good positive images were obtained by a reverse development method from negative original images having a continuous gradient.

Example 3

20 g. of photoconductive zinc oxide were dispersed in 200 ml. of distilled water. 200 mg. of cadmium chloride ($CdCl_2 \cdot 2.5H_2O$) were dissolved in this solution. 120 mg. of thioacetamide were added thereto and the solution was heated to 95° C. while stirring. After 40 minutes, a mother liquor was centrifugally removed. The residue was dispersed again in ethanol and again centrifugally separated. Into the thus resulting wet light yellow powder, 22 g. of toluene, 4 g. of styrenated alkyd resin and 800 mg. of hardener were blended for 15 minutes with a homomixer. The resulting paste was applied to the surface of an aluminum deposited polyethylene terephthalate film. The thickness after drying was 8 $\mu$.

This sensitive layer showed a —316 v. surface electric potential under a —4.5 kv. corona discharge, and had about 10 fold sensitivity increase for exposure to white light as compared with an untreated layer. The residual ratio of the electrical potential in the dark after 1 minute was 89%. Good positive images were obtained on a light yellow background by exposure through a positive original and developing using a liquid developer including a black positive toner.

Example 4

Cadmium sulfate was used instead of cadmium chloride in Example 1. The same result was obtained using substantially the same sensitive layer produced by the same procedure as in Example 1.

Example 5

Styrenated alkyd resin as in Example 3 was used as the binder instead of the vinyl chloride-based copolymer in Example 1 (the other parameters of Example 1 being followed). The residual ratio of the electrical potential in the dark was 87% and the other characteristics were substantially the same as in Example 1.

To briefly further describe some of the parameters of the invention which have heretofore been discussed, generally the amount of zinc oxide utilized in the present invention is from about 0.02–2 parts by weight to 1 part by weight of solvent. Further, the cadmium sulfide thickness may vary greatly, most preferably being within the range of from a molecular monolayer thickness to 1000 angstroms. The amount of solvent may also vary greatly, and is most preferably defined with respect to the amount of photoconductor, for instance, by 0.02–2 parts by weight zinc oxide per 1 part of weight of solvent. Although the amount of sulfur yielding compound may also vary greatly, this is most preferably maintained within the range 0.002–0.1 part by weight per 1 part by weight of zinc oxide. Further, it was heretofore indicated that organic solvents may be utilized, and the amount is generally below 30 parts. Although the time of reaction may also vary greatly, this is most preferably within the range 10 minutes–5 hours.

To further define the heating of the present invention with respect to the time of heating per se, the only true parameter which must be observed is that the suspension is not heated so rapidly so as to be thrown from the container utilized. Thus, there is no special rate of heating to be followed, and any state of the art techniques may be utilized to form the solutions and heat them to the temperature of cadmium sulfide formation. In the specification, the term "gradually" to describe the heating is utilized to signify heating at a rate which will enable the addition and reaction of the various materials utilized, i.e., no special importance is to be attached to the word "gradually."

To further amplify somewhat upon the examples, the size of the zinc oxide utilized in the examples was (Example 1) 0.6 micron and 0.3 micron (Example 3).

It should be further noted that there is no true minimum solubility which the sulfur or cadmium yielding materials must illustrate, but it is most preferred to utilize greater than 0.01 part by weight of the sulfur or cadmium yielding materials in the solution.

What is claimed is:

1. A process for producing a finely divided photoconductive powder adapted for electrophotography having sensitivity to blue rays which comprises heating at a temperature of from about 40° C. to about 100° C. a slurry which is prepared by adding a finely divided photoconductive zinc oxide powder to a solution comprising water as the main ingredient, which serves as a solvent, a sulfur containing water soluble compound which forms sulfur ions ($S^{--}$) by decomposition by heating to a temperature of from about 40° C. to about 100° C. with water, and a water soluble cadmium compound which provides cadmium ($Cd^{++}$) ions upon dissolution in water, cadmium sulfide being deposited on the surface of said photoconductive zinc oxide particles under said heating which causes the reaction of said ($Cd^{++}$) ions and said ($S^{--}$) ions.

2. The process as claimed in claim 1, wherein said sulfur containing water soluble compound is selected from the group consisting of thioformamide, thioacetamide and thiourea.

3. The process as claimed in claim 1 wherein said water soluble cadmium compound is selected from the group consisting of cadmium chloride, cadminium bromide, cadmium iodide, cadmium nitrate, cadmium sulfate and cadmium acetate.

4. The process of claim 1 wherein said water soluble cadmium compound is selected from the group consisting of water soluble inorganic cadmium salts and water soluble organic cadmium salts.

5. The process of claim 1 wherein said water soluble compound which forms sulfur ions is selected from the group consisting of thioalkylamides and alkylthioureas.

6. The process of claim 1 wherein the amount of cadmium sulfide added, with respect to the weight of said zinc oxide, is 1/1000 to 5/100.

7. The process of claim 1 wherein there is present at least at the initiation of said heating from 0.02 to 2 parts by weight per 1 part of said solvent of zinc oxide and from 0.002 to 0.1 part by weight per 1 part by weight of said zinc oxide of said water soluble compound which forms sulfur ions.

8. The process of claim 6 wherein said solvent consists primarily of water and a minor proportion of an organic solvent.

9. The process of claim 7 wherein said solvent consists essentially of water.

10. The process of claim 1 wherein said heating is conducted for a period of from 10 minutes to 5 hours.

11. The process of claim 1 wherein said solvent consists essentially of water, said sulfur containing water soluble compound which forms sulfur ions is selected from the group consisting of thioformamide, thioacetamide and thiourea, present in an amount of from 0.02 to 0.1 part by weight per 1 part by weight of said zinc oxide, said zinc oxide is present in an amount of from 0.02 to 2 parts by weight per 1 part by weight of said solvent, said water soluble cadmium compound is selected from the group consisting of cadmium chloride, cadmium bromide, cadmium iodide, cadmium nitrate, cadmium sulfate and cadmium acetate, and said heating is conducted for 10 minutes to 5 hours, whereby said cadmium sulfide is deposited on the surface of said photoconductive zinc oxide particles in the form of a layer completely enclosing said zinc oxide particles, said finely divided photoconductive powder thus consisting essentially of a zinc oxide core and a cadmium sulfide layer having a thickness of from a molecular monolayer to 1,000 A.

References Cited

UNITED STATES PATENTS

| | | | |
|---|---|---|---|
| 3,449,148 | 6/1969 | Shortes | 117—100 |
| 3,236,749 | 2/1966 | Baxendale et al. | 96—1.5 |
| 3,152,894 | 10/1964 | Tinker et al. | 252—501 |
| 2,980,500 | 4/1961 | Miller | 252—501 |
| 2,809,134 | 10/1957 | McIlvaine | 252—501 |

GEORGE F. LESMES, Primary Examiner

J. P. BRAMMER, Assistant Examiner

U.S. Cl. X.R.

96—1.5; 117—100 B